Aug. 28, 1956 — L. A. SOLOMON — 2,760,803
AUTOMOBILE DOOR LOCK SAFETY DEVICE
Filed March 8, 1955
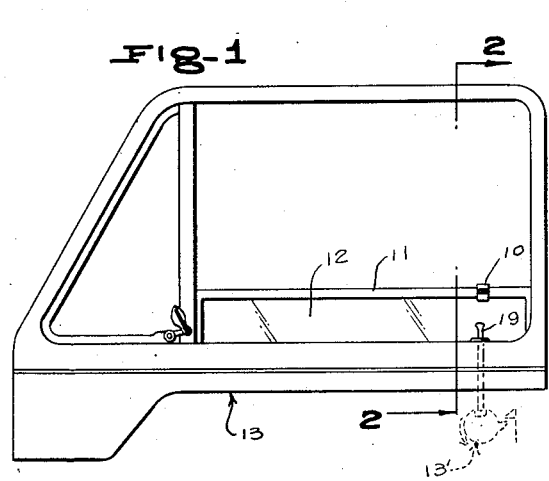
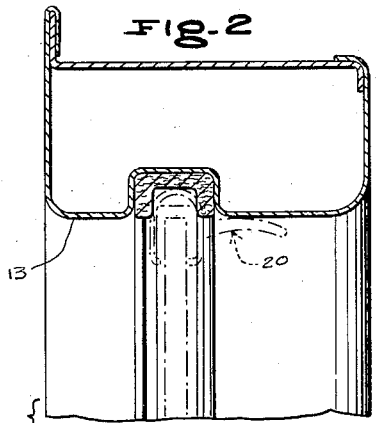
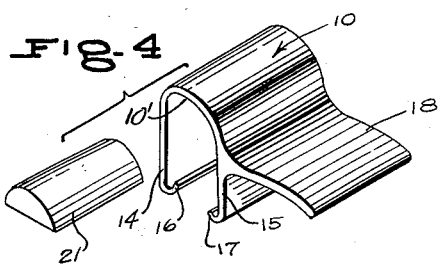
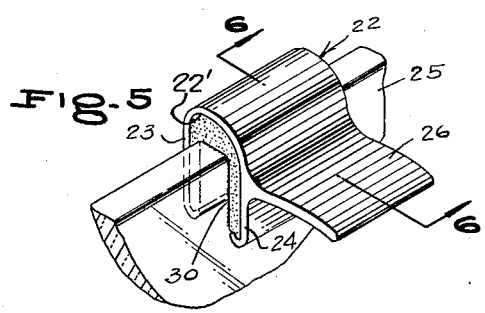
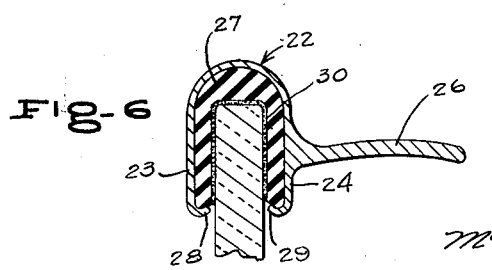
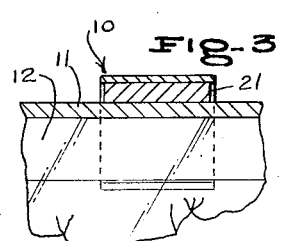
INVENTOR.
LEONARD A SOLOMON
BY
McMorrow, Berman + Davidson
ATTORNEYS

United States Patent Office 2,760,803
Patented Aug. 28, 1956

2,760,803

AUTOMOBILE DOOR LOCK SAFETY DEVICE

Leonard A. Solomon, Silver Spring, Md.

Application March 8, 1955, Serial No. 493,020

4 Claims. (Cl. 292—1)

The present invention relates to a safety device for releasably holding the latching plunger of an automobile door lock mechanism in latching position.

An object of the present invention is to provide a safety device which upon retractile movement of the window of an automobile door is operable to shift the latching plunger of the door's lock mechanism into lock latching position.

Another object of the present invention is to provide a safety device which is attachable to the window of an automobile door and which when the window is moved toward its retracted position will automatically depress the latching plunger of the door's lock mechanism into a lock latching position and will retain the door lock mechanism in latched position against manual release.

A further object of the present invention is to provide a safety device which is simple in construction, sturdily and inexpensively constructed, and one which is highly effective in action.

These and other objects and advantages of the present invention will be fully apparent from the following description when taken in connection with the anexed drawings, in which:

Figure 1 is a partial side elevational view of the upper part of a door of an automobile showing the present invention installed upon the upper molding of the door window, Figure 2 is an enlarged end view in cross section on line 2—2 of Figure 1, Figure 3 is a detail view in cross section on line 3—3 of Figure 2, Figure 4 is an isometric view of the first form of the present invention, Figure 5 is an isometric view of a second form or embodiment of the present invention as installed upon the upper edge of a window glass, and Figure 6 is an end view in cross section on line 6—6 of Figure 5.

In the first embodiment of the invention shown in Figures 1 to 4 inclusive, the top portion of an automobile door 13 is provided with an opening in which there is positioned a window 12 carrying a molding 11, the window being connected to the lower portion of the door for extensile and contractile movement with respect to the window opening. A safety lock device of the present invention and indicated generally by the numeral 10 is detachably secured to the molding 11 on the upper edge portion of the window 12. The safety lock device 10 embodies an element, attaching means on the element for securing the latter to the top edge portion of the window 12 so as to be carried thereby, and an inwardly extending projection. Specifically, the attaching means on the element comprises a pair of spaced legs 14 and 15 connected together at one end by a bight 10', the legs 14 and 15 having at the other ends inwardly bent portions 16 and 17 respectively, and the inwardly extending projection on the element is a ledge 18 which projects horizontally from the intermediate portion of the inner side of the leg 15 or the side remote from the leg 14. The device 10 is attached to the upper edge portion of the window 12 by positioning the bight 10' so as to straddle the molding 11 on the upper edge window portion with the legs 14 and 15 adjacent the face of the window 12 and the end portions 16 and 17 contacting the respective window faces.

The lock mechanism of the door 13 is shown in dotted lines in Figure 1 and is indicated by the reference numeral 13' and includes an upright reciprocal latching plunger or element 19 which is pressingly engaged by the ledge 18 upon movement of the window 12 from its extensile positions towards its retractile position. It is to be noted that the ledge 18 is of a size to substantially overlie the upper end of the latching element 19. The fully extended position of the window is indicated in dotted lines in Figure 2 with the safety device shown in dotted lines and indicated by the reference numeral 20, it also being shown in its position of engagement with the upper end of the latching element 19, this position being in dotted lines also, with the safety device indicated by the reference numeral 20'.

The latching element 19 is positioned on the door inwardly of the window 12 and projects by its upper end above the lower end of the opening in the door and has its lower end engageable with the conventional door locking mechanism 13', shown diagrammatically in Figure 1, so that when the latching element 19 is in its depressed or lowered position the door locking mechanism 13' is held in its locked position.

In attaching the safety device 10 to the molding 11 of the window 12, a semicylindrical resilient pad 21 is first inserted within the bight of the device 10 so that the molding 11 be protected against marring and also to provide a resilient cushion biasing the device 10 so that the end portions 16 and 17 grip the under edges of the molding 11.

In the second embodiment shown in Figures 5 and 6, the safety lock device 22 also embodies an element, with attaching means on the element comprising a pair of spaced legs 23 and 24 connected together at one end by a bight 22', the legs having at the other ends inwardly bent portions 28 and 29 respectively, and an inwardly extending projection or ledge 26 projecting horizontally from the intermediate portion of the inner side of the leg 24 or the side remote from the leg 23. The device 22 is attached to the upper edge portion of the window 25 for positioning the bight 20' so as to straddle the upper edge window portion with each of the legs 23 and 24 adjacent a face of the window and the end portions 28 and 29 facing toward the respective window faces. The ledge 26 is of a size to substantially overlie the upper end of the latching element 19 and pressingly engage the upper end of the latching element upon movement of the window 25 downwardly to shift the latching element to its position in which it will hold the door locking mechanism in the locked position.

In attaching the safety device of the second embodiment to the window 25, a U-shaped resilient pad 27 is provided which is held within the bight and between the legs 23 and 24 of the safety device 22 by the inwardly bent in portions 28 and 29, respectively. An adhesive coating 30 is supplied on the inner face of the pad 27 for securing the safety device 22 to the upper edge portion of the window 25.

In use, the safety device of either embodiment may be used upon the appropriately styled windows of an automobile and when each of the windows so equipped is lowered to its retracted position, the latching element of the lock mechanism of the door associated with the window will be moved to the position at which the door latching mechanism will prevent the door from being opened. A measure of safety is thus provided for the occupants of the automobile. The doors of the vehicle so equipped cannot be opened by operation of the outside or the inside handle with this safety device holding down the latching element.

The safety device of the present invention is of especial use when installed on the windows of automobiles having remotely controlled window opening and closing mechanisms. The operator of such an automobile is able to depress the latching plunger of each window selectively by actuating the appropriate switch controlling the particular mechanism.

What is claimed is:

1. For use with an automobile door having a window opening in the top portion thereof, a window connected to the lower portion of said door for extensile and retractile movements with respect to said window opening, and an upright reciprocating latching element positioned inwardly of said window and having the upper end portion above the lower edge portion of the window opening and having the lower end engageable with the door locking mechanism when the door is in its closed position to hold said mechanism in locked position; a safety lock device embodying an element, means for mounting said element on said window, and an inwardly extending projection on said element overlying the upper end of said latching element, said mounting means including means securing said element against movement relative to said window whereby said projection pressingly engages the upper end of said latching element upon movement of said window from its extensile position toward its retractile position to shift said latching element to its position for holding the door locking mechanism in locked position.

2. For use with an automobile door having a window opening in the top portion thereof, a window connected to the lower portion of said door for extensile and retractile movements with respect to said window opening, and an upright reciprocating latching element positioned inwardly of said window and having the upper end portion above the lower edge portion of the window opening and having the lower end engageable with the door locking mechanism when the door is in its closed position to hold said mechanism in locked position; a safety lock device embodying an element, means for mounting said element on said window, an inwardly extending ledge on said element overlying the upper end of said latching element, said mounting means including means securing said element against movement relative to said window whereby said edge pressingly engages the upper end of said latching element upon movement of said window from its extensile position toward its retractile position to shift said latching element to its position for holding the door locking mechanism in locked position.

3. For use with an automobile door having a window opening in the top portion thereof, a window connected to the lower portion of said door for extensile and retractile movements with respect to said window opening, and an upright reciprocating latching element positioned inwardly of said window and having the upper end portion above the lower edge portion of the window opening and having the lower end engageable with the door locking mechanism when the door is in its closed position to hold said mechanism in locked position; a safety lock device embodying an element, means for mounting said element on said window and including spaced legs connected at one end by a bight adapted to be arranged so that the bight straddles the upper end portion of said window with the legs adjacent the window faces, an inwardly projecting ledge on one of the legs of said mounting means overlying the upper end of said latching element, said mounting means including means securing said element against movement relative to said window whereby said ledge pressingly engages the upper end of said latching element upon movement of said window from its extensile position toward its retractile position to shift said latching element to its position for holding the door locking mechanism in locked position.

4. For use with an automobile door having a window opening in the top portion thereof, a window connected to the lower portion of said door fr extensile and retractile movements with respect to said window opening, and an upright reciprocating latching element positioned inwardly of said window and having the upper end portion above the lower edge portion of the window opening and having the lower end engageable with the door locking mechanism when the door is in its closed position to hold said mechanism in locked position; a safety lock device embodying an element, means for mounting said element on said window and including spaced legs connected at one end by a bight adapted to be arranged so that the bight straddles the upper end portion of said window with the legs adjacent the window faces, an inwardly projecting ledge on one of the legs of said mounting means overlying the upper end of said latching element, said mounting means including means securing said element against movement relative to said window whereby said ledge pressingly engages the upper end of said latching element on movement of said window from its extensile position toward its retractile position to shift said latching element to its position for holding the door locking mechanism in locked position, and a resilient pad interposed between the bight and legs of said attaching means and said window.

References Cited in the file of this patent

UNITED STATES PATENTS

| | | |
|---|---|---|
| 1,805,584 | Kemp | May 19, 1931 |
| 1,873,190 | Doller | Aug. 23, 1932 |
| 2,531,116 | Donoghue | Nov. 21, 1950 |
| 2,660,874 | Ziomek | Dec. 1, 1953 |
| 2,707,127 | Parsons | Apr. 26, 1955 |